United States Patent
Oda et al.

(10) Patent No.: US 10,953,469 B2
(45) Date of Patent: Mar. 23, 2021

(54) METHOD OF PRODUCING METAL POWDER

(71) Applicant: TOKUYAMA CORPORATION, Shunan (JP)

(72) Inventors: Hiroyuki Oda, Shunan (JP); Naoto Mochizuki, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 166 days.

(21) Appl. No.: 16/093,803

(22) PCT Filed: Apr. 7, 2017

(86) PCT No.: PCT/JP2017/014531
§ 371 (c)(1),
(2) Date: Oct. 15, 2018

(87) PCT Pub. No.: WO2017/183487
PCT Pub. Date: Oct. 26, 2017

(65) Prior Publication Data
US 2019/0076931 A1    Mar. 14, 2019

(30) Foreign Application Priority Data
Apr. 21, 2016 (JP) .............................. JP2016-085172

(51) Int. Cl.
*B22F 9/28* (2006.01)
*C01B 33/03* (2006.01)
*B22F 1/00* (2006.01)

(52) U.S. Cl.
CPC .............. *B22F 9/28* (2013.01); *B22F 1/0011* (2013.01); *C01B 33/03* (2013.01);
(Continued)

(58) Field of Classification Search
None
See application file for complete search history.

(56) References Cited

U.S. PATENT DOCUMENTS 5,498,446 A * 3/1996 Axelbaum ............... B01J 2/003
264/7
2002/0104474 A1    8/2002 Wakamatsu et al.
(Continued)

FOREIGN PATENT DOCUMENTS

EP    1579936 A1    9/2005
JP    1-239014 A    9/1989
(Continued)

OTHER PUBLICATIONS

International Preliminary Report on Patentability International Searching Authority, dated Oct. 23, 2018, issued in PCT/JP2017/014531 (Forms PCT/IB/373 and PCT/ISA/237).
(Continued)

*Primary Examiner* — George Wyszomierski
(74) *Attorney, Agent, or Firm* — Birch, Stewart, Kolasch & Birch, LLP

(57) ABSTRACT

A metal powder having a BET specific surface area of 5 to 250 $m^2/g$ is obtained by contacting and mixing together a gas of a metal chloride (metal source gas) and a reducing gas (e.g., hydrogen gas) that have been separately heated so as to instantaneously form fine metal particles based on the gas phase reduction reaction thereof, and collecting the fine metal particles from the gas stream after the reaction.

7 Claims, 4 Drawing Sheets

AA: SEALING GAS
BB: METAL CHLORIDE GAS
CC: DISTILLATION TOWER
DD: LOW-PRESSURE CHILLER
EE: HIGH-PRESSURE CHILLER
FF: ADSORPTION TOWER

(52) U.S. Cl.
CPC ..... *B22F 2201/013* (2013.01); *B22F 2201/40* (2013.01); *B22F 2304/056* (2013.01); *C01P 2004/03* (2013.01); *C01P 2004/32* (2013.01); *C01P 2004/62* (2013.01); *C01P 2004/64* (2013.01); *C01P 2004/80* (2013.01); *C01P 2006/12* (2013.01)

(56) References Cited

U.S. PATENT DOCUMENTS

| | | | |
|---|---|---|---|
| 2003/0131786 A1 | 7/2003 | Kauzlarich et al. | |
| 2005/0268992 A1* | 12/2005 | Kagohashi | H01G 4/0085 148/277 |
| 2007/0094757 A1 | 4/2007 | Pridohl et al. | |
| 2007/0172406 A1 | 7/2007 | Pridoehl et al. | |
| 2013/0136986 A1 | 5/2013 | Scoyer et al. | |
| 2013/0255443 A1* | 10/2013 | Han | B22F 9/26 75/367 |
| 2016/0141610 A1 | 5/2016 | Scoyer et al. | |

FOREIGN PATENT DOCUMENTS

| | | |
|---|---|---|
| JP | 2000-345218 A | 12/2000 |
| JP | 2002-029726 A | 1/2002 |
| JP | 2002-234721 A | 8/2002 |
| JP | 2003-002628 A | 1/2003 |
| JP | 2003-020217 A | 1/2003 |
| JP | 2005-8430 A | 1/2005 |
| JP | 2005-503984 A | 2/2005 |
| JP | 2005-248198 A | 9/2005 |
| JP | 2007-511460 A | 5/2007 |
| JP | 2007-513041 A | 5/2007 |
| JP | 2010-184831 A | 8/2010 |
| JP | 5258339 B2 | 8/2013 |
| JP | 5533601 B2 | 6/2014 |
| JP | 5618113 B2 | 11/2014 |
| JP | 2015-30886 A | 2/2015 |
| WO | WO 2012/054170 A1 | 4/2012 |

OTHER PUBLICATIONS

International Search Report (PCT/ISA/210) issued in PCT/JP2017/014531, dated May 9, 2017.

Extended European Search Report, dated Oct. 8, 2019, for corresponding European Application No. 17785827.1.

* cited by examiner

AA: SEALING GAS
BB: METAL CHLORIDE GAS
CC: DISTILLATION TOWER
DD: LOW-PRESSURE CHILLER
EE: HIGH-PRESSURE CHILLER
FF: ADSORPTION TOWER

METHOD OF PRODUCING METAL POWDER

TECHNICAL FIELD

This invention relates to a novel method of producing a metal powder comprising fine metal particles and having a large surface area.

BACKGROUND ART

At present, metal powders comprising fine metal particles and having large specific surface areas have been used or have been proposed for their use in a variety of applications, such as electrode materials for capacitors, lithium ion batteries, etc.

As the method of producing metal powders comprising such fine metal particles and having large specific surface areas, there has been known a method of depositing a metal in a liquid containing a metal source substance (called either a wet type method or a hydrothermal method).

When it is attempted to recover the particles of not larger than one micron relying on the wet type method, however, an extended period of time is required, the yield is low and, therefore, the cost becomes very high. According to a method of obtaining a metal powder of fine particles by utilizing a plasma, on the other hand, the cost of the equipment becomes very high, and the metal powder that is obtained becomes, eventually, very expensive. Therefore, this method is not suited for being carried out on an industrial scale, either.

There has also been known a method of decomposing a metal source substance by generating a plasma in the gaseous phase. For instance, Example 1 of a patent document 1 describes the production of an Si powder having an average primary particle size of about 60 nm by introducing a silicon (Si) source material (Si powder of a size of microns) into an argon plasma to vaporize it followed by cooling.

With the method of utilizing the plasma, however, it is difficult to obtain a metal powder having a small oxygen content. As will also be obvious from the disclosure of the above patent document 1, an Ar gas is usually used as the inert gas of a plasma source, and means is employed for feeding a metal source into the Ar plasma. Usually, however, the Ar gas unavoidably contains oxygen in an amount of about 100 ppm, and it is impossible to prevent oxygen from being mixed into the metal powder that is obtained.

Therefore, when it is attempted to produce the metal powder by the above method, there remains a problem in that the metal is oxidized in the reactor during the reaction for forming the particles. Specifically, the silicon powder tends to be very easily oxidized as compared to other metal powders. Despite of using the Ar gas of a very high purity, therefore, the silicon powder is covered with an oxide layer of not less than 5 nm in very short periods of time as soon as the particles thereof are exposed to the air though the oxygen content thereof is still low at the outlet of the reactor. Here, being caused by the generation of heat due to oxidation, the silicon powder could be self-ignited and explode. Therefore, the finely granular silicon has been regarded to be a very dangerous inflammable solid substance.

For instance, the Si powder obtained in Example 1 of the patent document 1 contains oxygen in an amount of 2.8% by mass. Here, presuming that the silicon particles have a surface area of 30 $m^2/g$ and that oxygen is all present on the surfaces, it could be simply calculated to be that the oxide layer has a thickness of about 1.2 nm. It is, therefore, estimated that the surfaces of the particles are still very highly active. That is, the silicon is a substance that can be oxidized very easily. Therefore, the surfaces thereof could be oxidized at one time as soon as they are brought into contact with the air, and could be instantaneously covered with the oxide layer of about 5 nm in the dry air. As the thickness of the oxide layer reaches about 5 nm, oxygen is supplied less from the exterior. Therefore, the oxidation reaction on the surface gradually decreases and the oxide layer ceases to grow after about 10 nm under a condition of room temperature and dry state. If the environment contains much water, however, the oxide layer could become thicker and could grow to several hundreds of nanometers.

The present inventors have analyzed typical silicon particles having a specific surface area of 22 $m^2/g$ prepared by the plasma method and placed in the market, and discovered that the silicon particles contained oxygen at a concentration of 18%, which could then be calculated to be capable of forming an oxide layer in a thickness (apparent oxide layer thickness) of 8 nm. The particles of this kind are not likely to explode despite they are exposed to the air, and have been placed in the market as relatively safe particles though they can be still regarded to be inflammable solid substance.

As a method, without relying upon the oxidation, of inactivating the silicon particles that are produced by using the plasma pulses and whose surfaces are very active and dangerous, there is a method of introducing methane or ethylene into a reactor to react it with the silicon particles after the step of forming the silicon particles. This method inactivates the silicon particles by covering the surfaces thereof with carbon, and is effective in securing safety, but is not desired for the applications where importance is given to the activity of the particles. When used as an active material for a lithium-ion battery, for example, a very strong Si—C wall could not only impair the flow of ions but also robs the Si atoms of their activity.

As a method of producing metals such as silicon, etc., there has been known a so-called gas phase reduction method. For example, a patent document 2 is disclosing a method of producing metal silicon based on the gas phase reduction by using a silicon chloride as a silicon source and a hydrogen gas as a reducing gas.

According to this method or a similar CVD method (chemical vapor phase deposition method), however, the chloride can be reduced but the film grows on the metal surfaces repetitively, and the product is obtained in the form of large solid bodies. Therefore, the metal particles are little nucleated and, therefore, the above method is not applied to the production of a metal powder that comprises fine particles. In fact, the patent document 2 is depositing the metal silicon on the wall surface of the reactor and is melting it to fall down so as to obtain the metal silicon.

As a similar technology, further, a patent document 3 proposes a method of producing fine silicon particles by gasifying metal zinc, mixing and stirring a zinc gas and silicon tetrachloride, and flowing the mixture thereof turbulently in a tube maintained at 1050° C. to 1250° C.

This technology, too, is capable of producing the silicon particles. If the silicon tetrachloride and zinc are fed in gaseous forms, however, the volumes of the gases decrease conspicuously before and after the reaction, and the pressure in the system becomes negative. To compensate for this defect and to maintain a balance in the pressure between the inlet port and the exit port, therefore, the patent document 3 carries out the operation batchwise, or carries out the operation continuously by feeding the silicon tetrachloride in the liquid form and maintaining a balance in the pressure in the process. Here, to produce the particles (having a minimal unit of several nanometers to several tens of nanometers) having large surface areas, the particles must be grown without spending extended periods of time and the formation of the particles must be terminated instantaneously. In the continuous method which reduces the zinc, however, the silicon tetrachloride must be fed in the liquid form. Therefore, the temperature of the silicon tetrachloride is gradually elevated while heating and stirring the mixed gas to let the particles grow. This method, therefore, is not capable of forming the particles having sufficiently large surface areas. Besides, the silicon produced by this method contains zinc as an unavoidable impurity, which is not desirable.

There has also been known a method of forming a fine silicon powder by the thermal decomposition by using, as a starting material, a low-boiling self-decomposing gas containing silicon. However, easily decomposing gases such as monosilane and monochlorosilane much contain molecules that work to increase stickiness among the particles of $SiH_2$ and $SiH_3$ on the surfaces. Therefore, the silicon particles that have grown join together easily and grow into large particles. Therefore, what are obtained are large particles having sizes of about several hundreds of nanometers. As a result, it is not possible to obtain a powder having a large specific surface area.

PRIOR ART DOCUMENTS

Patent Documents

Patent document 1: Japanese Patent No. 5618113
Patent document 2: Japanese Patent No. 5258339
Patent document 3: Japanese Patent No. 5533601

OUTLINE OF THE INVENTION

Problems that the Invention is to Solve

It is, therefore, an object of the present invention to provide a method of producing a metal powder which contains little impurities such as oxygen immediately after the production, by inexpensive means without using plasma, the metal powder having a large specific surface area and without being easily oxidized even after left to stand in the air.

Another object of the present invention is to provide a silicon powder obtained by the above-mentioned method.

Means for Solving the Problems

The present inventors have conducted experiments and study extensively concerning the method of producing a metal powder having a large specific surface area by using a metal chloride and a reducing gas as starting materials. As a result, the inventors have devised a reaction mechanism called superheated non-equilibrium nucleation method (hereinafter abbreviated as SNN method) which is based on an idea quite different from the traditional idea, and have succeeded in obtaining a metal powder that has a large specific surface area and that is not easily oxidized despite it is left to stand in the air. If briefly described, this is a method in which the metal chloride and the reducing gas are heated up to the superheated state, and the metal chloride is instantaneously reduced in an unstable non-equilibrium field, whereby nuclei are formed at one time in large quantity, and very fine metal particles are formed.

According to the present invention, there is provided a method of producing a metal powder including:

a preparatory step of providing a metal chloride gas and a reducing gas;

a gas phase reduction step in which the metal chloride gas and the reducing gas are contacted and mixed together so as to undergo a gas phase reduction reaction to form metal particles in a gas stream thereof; and a collection step of obtaining a metal powder by collecting the metal particles from the gas stream after the gas phase reduction reaction; wherein, in the preparatory step, the metal chloride gas and the reducing gas are heated separately from each other, the metal chloride gas being maintained at a temperature lower than a thermal decomposition temperature of the metal chloride;

in the gas phase reduction step, the metal chloride gas and the reducing gas are contacted together so that the temperature of the mixed gas of the metal chloride gas and the reducing gas becomes higher than a temperature at which the gas phase reduction reaction takes place; and the metal powder obtained through the collection step has a BET specific surface area of 5 to 250 $m^2/g$.

In the production method of the present invention, the following means can be favorably employed:
(1) In the gas phase reduction step, after the metal chloride gas and the reducing gas are contacted together, the gas after the reaction is readily cooled;
(2) In the preparatory step, a multiple tube is used, the metal chloride gas is fed into at least one tube of the multiple tube, and the reducing gas is fed into at least the other tube of the multiple tube such that the metal chloride gas and the reducing gas are separately heated in the multiple tube;
(3) In the gas phase reduction step, the metal chloride gas and the reducing gas meet together and contact together at the gas outlet port of the multiple tube to undergo the gas phase reduction reaction; and
(4) The reducing gas is a hydrogen gas.

Further, when the production method of the present invention uses a hydrogen gas as the reducing gas, the following means can be favorably employed:
(5) A silicon chloride is used as the metal chloride, and a silicon powder is obtained as the metal powder;
(6) The silicon chloride is a trichlorosilane or a silicon tetrachloride;
(7) After having collected the metal particles contained in the gas stream after the reaction, the hydrogen gas is separated from the gas stream and is fed to the preparatory step; and
(8) After having collected the formed metal particles from the gas stream after the reaction, the hydrogen gas and the metal chloride containing the metal particles are separated from the gas stream followed by the recovery of the metal particles contained in the metal chloride that is separated and, thereafter, the metal chloride is fed to the preparatory step.

According to the present invention, there is obtained, relying on the above-mentioned method, a silicon powder having a BET specific surface area in a range of 5 to 250 $m^2/g$ and an oxide layer of an apparent thickness of less than 5 nm as measured after having been left to stand in the air of normal temperature, normal pressure and a humidity of 50% for 24 hours.

Effects of the Invention

According to the production method of the present invention, there is obtained a metal powder having a large specific surface area, i.e., having a BET specific surface area in a range of 5 to 250 m²/g. Namely, the production method of the present invention is a dry method which enables the particles to be easily separated and in high yields. Besides, since no plasma is used, the method does not require any special apparatus. As a result, the cost of production can be greatly decreased accounting for the greatest advantage of the present invention.

Moreover, the method does not use a plasma gas that permits oxygen to be easily mixed, but employs the reduction reaction. It is, therefore, made possible to prevent oxygen from being mixed during the reaction. Besides, the obtained metal powder is not easily oxidized despite it comes in contact with the air.

For instance, when a chloride of silicon is used as the metal chloride and a hydrogen gas is used as the reducing gas, the obtained silicon powder not only has the large BET specific surface area as described above but also is less subject to be oxidized even if it is left to stand in the air despite of its a large specific surface area. Therefore, the silicon powder can be safely handled. The silicon powder of this kind had not been known so far.

The fact that the metal powder and, specifically, the silicon powder obtained by the present invention is not easily oxidized in the air, will be demonstrated in Examples appearing later. The inventors presume the reasons for it to be as described below.

Namely, in the silicon powder obtained by the production method of the present invention, it is presumed that much of the surfaces of the silicon particles forming the silicon powder are terminated with chlorine. Besides, if a ratio of atomic sizes of hydrogen and chlorine is considered, it is presumed that, in reality, most of the surfaces are covered with large chlorine atoms and with a double bond of silicon atoms crushed by chlorine. Due to this effect, the metal particles produced by the production method (SNN method) of the present invention little undergo the reaction with oxygen yet having the large specific surface area. Therefore, the metal particles remain stable and can be safely handled.

Further, when used as an active material for the lithium ion battery, the above silicon powder and the agglomerate thereof have greatly improved cracking resistance due to the size of the primary particles thereof. Besides, lithium ions are less collected with oxygen and the degree of deactivation is lowered, that were so far observed with the Si—O type negative electrode materials. Therefore, the silicon powder can be favorably used as a negative electrode activating material in the lithium ion secondary batteries.

MODES FOR CARRYING OUT THE INVENTION

<Principle of the Production Method>

Figure 1:
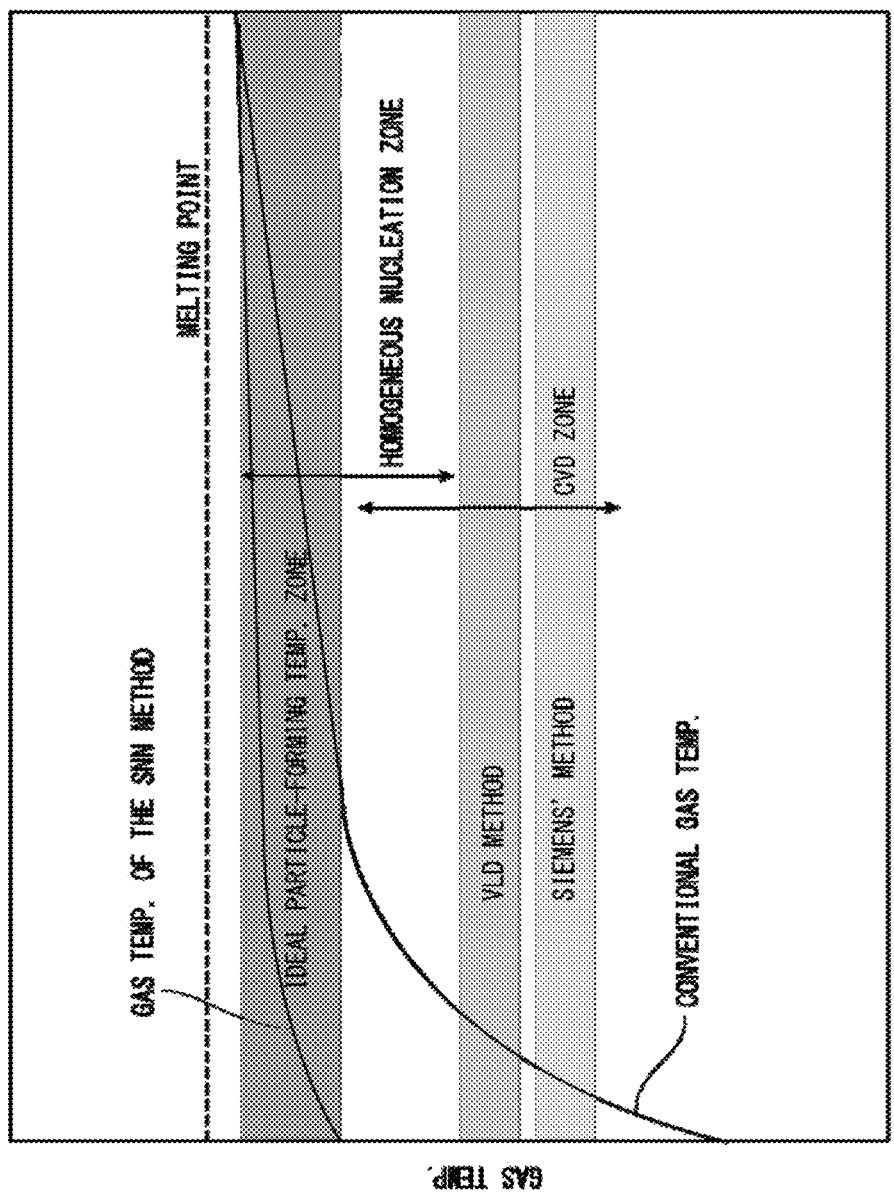
FIG. 1 It is a diagram for illustrating the principle of a production method of the present invention.

Roughly speaking, the method of producing the metal powder based on the SNN method employed by the present invention comprises:

a preparatory step of providing a metal chloride gas and a reducing gas that are separately heated;

a gas phase reduction step in which the metal chloride gas and the reducing gas are contacted and mixed together so as to undergo a gas phase reduction reaction to form metal particles in the gas stream; and a collection step of obtaining a metal powder by collecting metal particles from the gas stream after the gas phase reduction reaction;

wherein an important feature resides in the employment of the following means; i.e., (A) in the preparatory step, the metal chloride gas and the reducing gas are heated separately from each other, the metal chloride gas being maintained at a temperature lower than a thermal decomposition temperature of the metal chloride; and (B) in the gas phase reduction step, the metal chloride gas and the reducing gas are contacted together so that the temperature of the mixed gas of the metal chloride gas and the reducing gas becomes higher than a temperature at which the gas phase reduction reaction takes place.

That is, the metal chloride gas and the reducing gas that are heated as above are contacted together so that the temperature of the mixed gas thereof becomes higher than a temperature at which the gas phase reduction reaction takes place. Namely, at least either the metal chloride gas or the reducing gas is heated at a temperature higher than a temperature at which the gas phase reduction reaction takes place (higher than a metal nucleation temperature) such that the gas phase reduction reaction of the metal chloride is executed instantaneously. Upon contacting and mixing these gases that are heated at such temperatures, there are formed fine metal particles simultaneously as the gases are mixed together. Here, the fine metal particles are not permitted to grow but are caused to agglomerate or are readily collected in order to obtain a metal powder having a desired large. BET specific surface area.

The SNN method will now be described in detail with reference to FIG. 1.

To grow the particles in the gas phase, in general, a mixed gas of the starting gas and the reducing gas is fed into a tube of a high temperature to elevate the gas temperature so that the reaction takes place. Here, to generate the particles in the gas, the starting gas must be reacted in the homogeneous nucleation zone shown in FIG. 1. However, the homogeneous nucleation zone is accompanied by the presence of a region where the temperature is lower than the temperature in the above region, i.e., the region which is also called a chemical vapor deposition zone (CVD zone) or a heterogeneous growth zone. Therefore, if it is attempted to form the particles by heating the starting gas, then the starting gas is forced to pass through the CVD zone during the step of heating. If there are present a small number of particles that could turn into nuclei in this zone, then the starting gas decomposes on the surfaces of the nuclear particles due to the CVD reaction and a solid material deposits like a film. In the CVD zone, further, the film thickness increases with an increase in the temperature, and the upper-limit temperature range of the CVD zone overlaps the lower-limit temperature range of the nucleation zone. Therefore, if the temperature in the step of heating reaches the lower end of the nucleation zone, then a small number of nuclear particles are formed and, at the same time, the film is formed at a high rate around the nuclear particles due to the CVD reaction permitting the particles to quickly increase their diameters. According to the method of elevating the temperature of the starting gas by heating, therefore, it is allowed to produce only large particles. In the method of producing silicon based on the known melt deposition method (VLD method) or the Siemens' method, as will be understood from FIG. 1, the temperature region lies within the CVD zone.

To avoid the growth of particles that was described above, the starting gas should be heated at one time to an ideal particle-forming temperature zone that is shown in FIG. 1. From the view point of chemical engineering, however, it is impossible to elevate the temperature of the starting gas at one time. The plasma pulse method has been widely used as a method of instantaneously elevating the temperature of the starting metal gas necessitating, however, special equipment and greatly driving up the cost as described earlier.

According to the present invention, however, the gas of the metal chloride that is the metal source and the reducing gas are separately heated in advance, and the temperature of the mixed gas of when the above two gases are contacted and mixed together is elevated to be not lower than a metal nucleation temperature of the gas phase reduction reaction. This makes it possible to produce the nucleating particles instantaneously and in large amounts. Moreover, the metal chloride that is the starting material for CVD is all used up instantaneously making it, therefore, possible to effectively avoid the growth of particles or the agglomeration of particles. The present inventors have thus succeeded in obtaining a metal powder that comprises fine particles and having a large BET specific surface area. That is, to instantaneously form the nucleating particles, the gas of the metal chloride and the reducing gas are separately heated at their predetermined temperatures so that the temperature of the mixed gas of when the two gases are contacted and mixed together is in a temperature zone which is not lower than the "ideal particle-forming temperature zone", i.e., not lower than the metal nucleation temperature based on the gas phase reduction reaction but is lower than a melting point of the metal.

Here, the gas of the metal chloride and the reducing gas should be so heated that when the two gases are contacted and mixed together, the temperature of the mixed gas thereof is in the above-mentioned ideal particle-forming temperature zone. If either gas is heated at a low temperature, then the other gas may be heated to a sufficient degree. Most desirably, however, the two gases should be heated so as to lie in the above-mentioned temperature zone.

In the present invention, the above ideal particle-forming temperature zone varies depending on the kind of metal that is to be formed and cannot be exclusively specified. In the case of silicon, for example, the ideal nucleation temperature zone is not lower than 1100° C. at which the nucleation takes place efficiently but is lower than the melting point of the silicon, i.e., not higher than 1400° C. More preferably, it is recommended that the ideal nucleation temperature is not lower than 1150° C. at which the chloride of silicon dissociates to an intermediate degree and silylene ($SiCl_2$) which causes nucleation starts generating much but is not higher than 1350° C. at which the silicon powder aggregates little.

When the above-mentioned means is employed, the metal chloride that is the metal source reacts with the reducing gas without passing through the above-mentioned particle growth zone. Moreover, fine particles that could become nuclei are formed instantaneously and in many number and, besides, the nuclear particles are carried away without stagnating the gas stream. Therefore, the concentration of the metal source becomes lean around the particles that are formed, and the metal chloride gas that is newly fed does not cause the diameters to increase. Moreover, despite a subsequent drop in the temperature, it is made possible to effectively suppress a decrease in the diameters of the particles caused by etching with the hydrogen chloride that is by-produced.

As described above, the present invention makes it possible to obtain a metal powder which comprises fine particles (e.g., nano-sized particles) and has a large BET specific surface area.

<Metal Species and Metal Source Gas>

The metal used in the production method of the present invention includes not only transition metals but also semi-metals such as Si and Ge, as well as base metals, alkali metals and alkaline earth metals. The relationship between the above-mentioned homogeneous nucleation zone and the particle growth zone holds true for almost all metals, and no particular limitation is posed on the desired metal species. From the standpoint of gasification and quick reduction reaction by using the reducing gas, however, there can be exemplified silicon (Si), cobalt (Co), nickel (Ni), copper (Cu) and (Fe). Specifically, these metal species have the homogeneous nucleation zones that lie in nearly the same regions, and are very preferred for carrying out the production method of the present invention.

Moreover, the present invention can be most preferably applied to the production of a silicon powder that will be easily oxidized even at normal temperature if it is left to stand in the air, because of such reasons that the metal powder obtained by the present invention has a large specific surface area, contains oxygen little at a moment when it is produced, is subject to be little oxidized, has properties that could not be obtained at all by the conventional methods, and is thus very useful.

As the metal source for obtaining the above-mentioned metal powder, there is used a chloride depending on the desired metal species. Preferably, however, there are used the following compounds from the standpoint of easy gasification and little probability of self-decomposition at temperatures in the above-mentioned ideal particle-forming temperature zone in the gas phase reduction reaction.

Here, the self-decomposition stands for the formation of a metal by being thermally decomposed by the heat of before being mixed with the reducing gas.

When it is attempted to produce, for example, a silicon powder, there can be used dichlorosilane, trichlorosilane or silicon tetrachloride and, specifically, trichlorosilane or silicon tetrachloride.

The dichlorosilane has a low decomposition temperature, and permits particles to come into collision with one another to grow into large particles. Therefore, though not definitely, it is not recommended to use it as the starting material.

When it is attempted to produce other metal powders, there can be used cobalt chloride ($CoCl_2$), nickel chloride ($NiCl_2$), copper chloride ($CuCl_2$) or iron chloride ($FeCl_3$) in a form of being gasified.

<Reducing Gas>

There is no particular limitation on the reducing gas if it has its function, and there can be used a metal vapor as represented by zinc in addition to hydrogen. Even having been gasified, however, the metal vapor cannot be dispersed in a completely molecular form. As a result, the metal vapor is not suited for instantaneously producing large amounts of nuclei or for forming metal particles having large surface areas. Moreover, additional costs are required for reutilizing the by-produced metal chloride such as zinc chloride that generates when chlorine is removed from the metal chloride. On the other hand, hydrogen is best suited as the reducing gas for the SNN method from such viewpoints that it is always dispersed in a unit of molecules, it can be easily refined when it is to be reused, it can be easily handled, and it enables the by-produced chloride to be be easily reused.

The reducing gas is used in an amount nearly equivalently to the gas of the metal chloride that is used. Here, the higher the concentration of the reducing gas, the more the reaction temperature can be lowered. Besides, the reverse reaction occurs less i.e., the particles are less etched while being cooled. It is, therefore, desired that the reducing gas is used in an amount in excess of the above-mentioned amount. However, if the amount of the reducing gas is increased too much, more energy is needed for heating the gas, which is not economical. It is, therefore, desired that the reducing gas is used in an amount of 1.2 to not more than 10 times equivalent, further preferably, 1.2 to 5 times equivalent and, most preferably, 1.5 to 3 times equivalent to the gas of the metal chloride that is used.

For instance, when a trichlorosilane gas is used, the reduction reaction is expressed by the following formula,

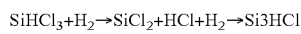

$$SiHCl_3 + H_2 \rightarrow SiCl_2 + HCl + H_2 \rightarrow Si3HCl$$

In this case, therefore, the hydrogen gas may be fed at a flow rate of about one mole or, preferably, more than one mole per mole of the trichlorosilane.

<Conditions for Feeding the Gases>

In the present invention, the metal chloride gas and the reducing gas are not contacted or mixed together, but are separately heated and are fed into the reactor where they are allowed to be contacted and mixed together, and are, thereafter, discharged from the reactor.

The heated metal chloride gas and the reducing gas are contacted and mixed together in a manner that the mixed gas thereof flows turbulently. The two gases are thus quickly stirred and mixed together to form particles having nearly a uniform diameter. That is, depending on the tubular diameter of the reactor, the rate of feeding the metal chloride gas and the reducing gas is so set that the Reynolds number of the stream of the mixed gas becomes, for example, 4000 or more.

<Production Line>

In the present invention, the metal chloride gas and the reducing gas are contacted and mixed together as described above, and the fine metal particles that are formed are collected to obtain a desired metal powder having a large specific surface area.

Figure 2:
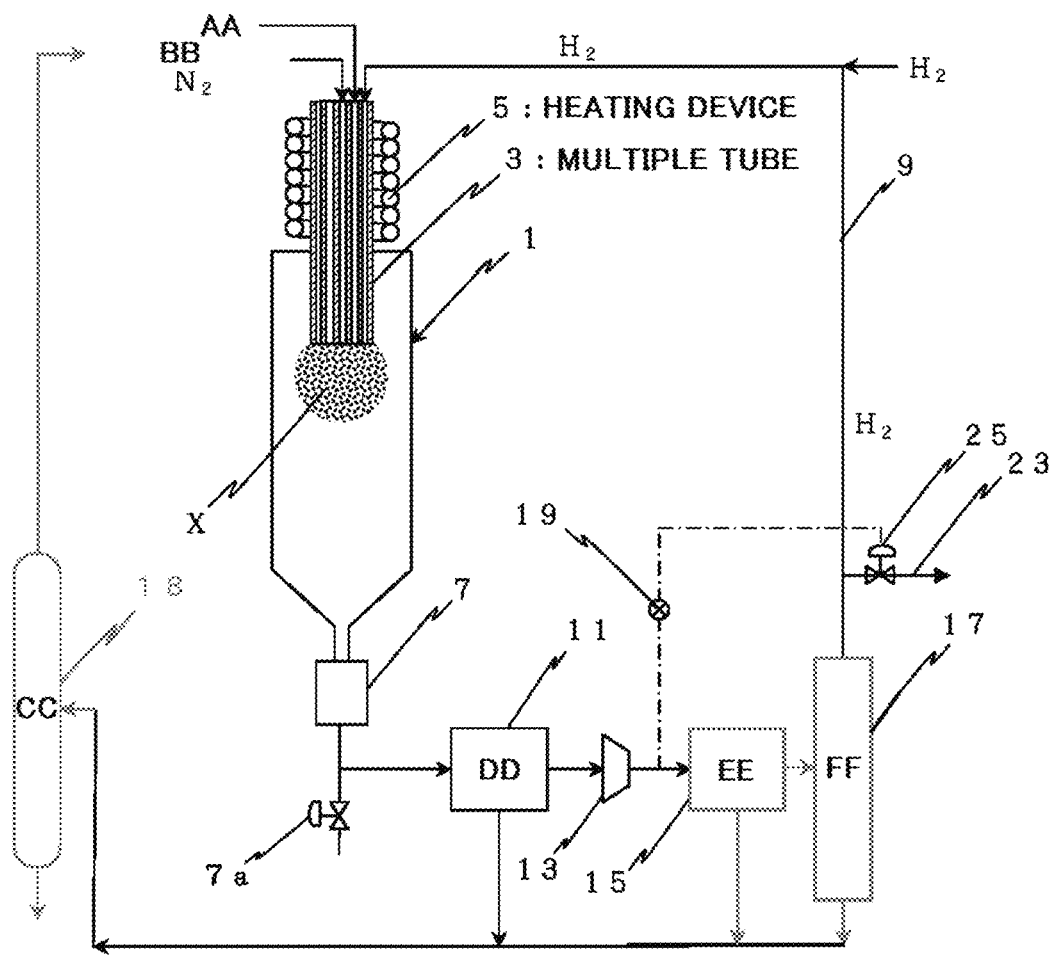
FIG. 2 It is a diagram illustrating a preferred production line employed for carrying out the production method of the present invention.

FIG. 2 illustrates a production line for carrying out the method of the present invention in the case when a hydrogen gas is used as the reduction gas.

In FIG. 2, a multiple tube 3 is connected to an upper part of a reactor 1 to feed the metal chloride gas and the hydrogen gas, and a collector 7 is connected to the lower end of the reactor 1. A circulation line 9 is connected to the collector 7 to circulate the hydrogen gas as will be described later.

The reactor 1 has a cylindrical shape and is provided, at its upper portion, with the multiple tube 3 with its lower end open. The interior of the multiple tube 3 serves as the preparatory step.

The metal chloride gas is fed to the one tube of the multiple tube 3 and the hydrogen gas is fed to the other tube of the multiple tube 3. In addition to the tubes for feeding the metal source gas and the hydrogen gas, there can be, further, provided in the multiple tube 3 a tube for flowing an inert gas as the sealing gas to thereby adjust the distance between the end of the nozzle and the reaction field and to observe the state of reaction at the end of the multiple tube.

It is desired that the multiple tube 3 is formed by using a material having a heat resistance and that reacts little with the starting gas or the reducing gas, such as graphite, tungsten or molybdenum.

Further, the multiple tube 3 is equipped with a heating device 5 such as of heating by conduction, heating by induction, dielectric heating or infrared-ray heating to heat the gases that flow therein. Therefore, the metal chloride gas and the reducing gas are fed being heated at predetermined temperatures as they flow through the multiple tube.

When the multiple tube is used, it is difficult by using only one source of heating to correctly control the temperatures of the gases that flow therein. Therefore, the respective tubes are provided with the independent heaters to separately control the temperatures of the gases. For this purpose, there can be employed a method by which the nozzles are arranged not in concentric with each other but neighboring to each other, or a method by which the nozzles are arranged in a Y-shape and the reaction is executed at a point of confluence.

As will be understood from the above structure, the metal chloride gas and the reducing gas are heated at predetermined temperatures in the multiple tube 3, and come into contact and mixed together on their outlet side. The region of contact and mixing on the outlet side (designated at X in FIG. 2) serves as the gas phase reduction step. The gases have been so heated that the temperature in the contacting/mixing region X lies in the ideal particle-forming temperature region. In this temperature region, therefore, the reduction reaction takes place instantaneously, and nucleating metal particles are formed much.

The gas after the reaction that has passed through the region X and that contains metal particles, then passes through a temperature region in the particle growth zone as the temperature drops due to cooling in the reactor 1. Here, the metal chloride gas around the formed particles is consumed by the reaction for forming the particles, and its concentration is low. Therefore, the particle growth zone is no longer present. Accordingly, growth of the particles is effectively suppressed in this zone, too.

A number of nuclear particles formed in the region X are in a monodispersed state at first but undergo aggregation or agglomeration with the passage of time prior to assuming the final form. Thereafter, the nuclear particles are discharged out of the reactor 1 as they are cooled, are introduced into the collector 7 connected to the reactor 1, and the fine metal particles that are formed are collected. The region equipped with the collector 7 serves as the collection step.

The cooling has two major objects and where the desired temperature regions are not the same.

The first object is to maintain a large surface area by preventing the aggregation. The aggregation is necessary to some extent to increase the bulk density of the particles. As the aggregation proceeds too much, however, the specific surface area decreases and properties inherent in the ultra-fine particles decrease, too, which is not desirable. In the case of, for example, silicon particles, therefore, it is desired to quickly lower the temperature down to 1300° C. or lower in less than 0.1 seconds.

The second object is to prevent the etching caused by the secondary reaction with the hydrogen chloride that generates when the by-produced chloride is used and, specifically, when hydrogen is used as the reducing gas. The metal particles are etched with the hydrogen chloride at various temperatures and also depending much upon the impurities having catalytic action. Specifically, the silicon having a purity of as high as 99% or more is etched in the gas phase if the temperature is not lower than 900° C. To obtain the silicon powder having a specific surface area of 5 to 250 m²/g while avoiding the dissipation of the particles caused by etching, it is desired that the formed particles are cooled down to 800° C. at which the etching reaction does not almost occur in less than a second and, if possible, in less than 0.5 seconds. It is, therefore, desired to provide cooling means such as water-cooled pipes or heat-conducting blocks (not shown) at the lower part of the reactor 1, to pour down a shower of inert coolant that is recoverable, such as a liquid obtained by cooling and condensing the reacted waste gas, or a liquid silicon tetrachloride in order to cool down the gas after the reaction that contains the metal powder.

The collector 7 collects the metal powder in a form having fine primary particle diameters. Namely, there is collected a metal powder having a BET specific surface area of 5 to 250 m²/g and, specifically, 10 to 100 m²/g.

There is no particular limitation on the collector 7 provided it is capable of removing fine particles from the gas stream. Usually, however, a bag filter is used. Or it is, further, allowable to incorporate a scrubber in a process for cooling, liquefying and circulating the reacted waste gas or to employ a means for collecting the particles that are electrically charged by being passed through a discharge tube by using an electrode or by using reversely charged particles.

The waste gas that has passed through the collector 7 is then introduced into the circulation line 9. The circulation line 9 can be provided with a low-pressure chiller 11, a compressor 13, a high-pressure chiller 15 and an adsorption tower 17.

That is, the waste gas that has passed through the collector 7 is circulated by the compressor 13. Here, the waste gas contains, in addition to the hydrogen gas, fine metal particles that were not collected, unreacted metal chloride, by-produced metal chloride and hydrogen chloride formed by reduction. The components except hydrogen contained in the mixed gas are almost all removed as they pass through the low-pressure chiller 11, adsorption tower and high-pressure chiller 15. The mixed gas is finally separated through the adsorption tower 17 into a gas chiefly comprising hydrogen and a gas containing hydrogen chloride and other gases, which are then circulated.

Here, as shown in FIG. 2, the hydrogen gas is fed into the circulation line 9 at such a flow rate as to compensate for hydrogen that is dissipated.

On the other hand, the liquid metal chloride containing metal particles separated from hydrogen by the above method is refined into a single component through the distillation tower, and is used being quantified in order to easily control the properties of the reaction product or metal particles. Further, the liquid on the high boiling side separated through the distillation tower contains metal particles much. Therefore, the particles are separated in the drying step such as of spray drying, and are added to the product to increase the yield.

In the process mentioned above, it is also allowable to treat in the distillation tower 18 the condensate that is separated by low-pressure chilling and high-pressure chilling, and feed the gasified metal chloride again to the reaction. In the SNN method by which the reaction is completed instantaneously, there is almost no need of paying attention to the growth of particles. Therefore, despite the metal compound, in which the metal particles may be remaining, is fed again to the reactor, no significant difference is seen in the product that is obtained. Because of the same reason, furthermore, the obtained product is not seriously affected, either, by the unrecovered fine metal particles that are contained in hydrogen.

In the process mentioned above, the fine metal particles collected in the collector 7 are taken out by, for example, discontinuing the feed of the metal source gas and the hydrogen gas. Further, a release valve 25 of the circulation line 9 is opened, and a gas is purged through a blow-out line 23. Thereafter, a valve 7a provided under the collector 7 is opened, and the fine metal particles collected in the collector 7 are recovered in the form of a powder in a hydrogen atmosphere by utilizing the pressure of the hydrogen gas.

The thus obtained metal powder has a BET specific surface area in a range of 5 to 250 m²/g and, specifically, 10 to 100 m²/g, and is all treated in a reducing atmosphere without at all coming in contact with oxygen. Therefore, the metal powder immediately after it is produced does not substantially contain oxygen.

The present inventors have confirmed that the metal powder obtained by the above-mentioned method of the present invention has been terminated on not less than 20% of the surfaces thereof with chlorine due to the method of production thereof. Considering from the size of the chlorine atoms, therefore, it is estimated that the metal powder is assuming a structure that can be oxidized very difficultly.

In either case, even when exposed to the air, the metal particles produced by the SNN method of the present invention generates very little heat unlike the metal powders obtained by the conventional production methods, and are industrially very advantageous from the standpoint of safety of when the metal powder is treated in large amounts. For instance, the metal powder is capable of maintaining safely even when it is treated in such a unit amount of a total surface area (specific surface area×weight) of not less than 1000 m².

Specifically, it has been confirmed that the silicon powder obtained by the method of the present invention has a BET specific surface area that lies in the above-mentioned range, and forms an oxide layer in an apparent thickness of 5 nm as measured after it was left stand in the air of normal temperature (25° C.), normal pressure (atmospheric pressure) and a humidity of 50% for 24 hours.

In particular, the silicon powder having the above-mentioned properties can be favorably used for producing, on an industrial scale, the negative electrode materials of, specifically, lithium ion secondary batteries. For example, there is, usually, used graphite of a small capacity as the negative electrode material of the car-mounted lithium ion secondary batteries. The metal silicon, on the other hand, has a very high performance for collecting lithium ions, and has been regarded to be a promising material for its large capacity accompanied, however, by such a problem that the metal silicon might crack during the occlusion of lithium ions unless the particle diameters are very small. Further, the silicon particles having very small particle diameters, i.e., having a large specific surface area, contain much oxygen in proportion to the surface area thereof, from which, therefore, the properties specific to the silicon cannot be utilized. Moreover, even if a material having a large specific surface area and a low oxygen concentration is developed on an experimental basis, the silicon thus obtained would be not only very expensive but also is prone to undergo explosion. Therefore, the silicon of this kind has been regarded to be very cumbersome to handle on an industrial scale and is not feasible to be put into practical use.

On the other hand, the silicon powder obtained by the above-mentioned method has a large BET specific surface area and is little likely to be cracked despite it has occluded lithium ions. Besides, since it contains oxygen in very decreased amounts, it is allowed to effectively eliminate such an inconvenience that oxygen reacts with lithium ions. Moreover, since the silicon powder has such a structure that the surfaces thereof is little likely to be oxidized, no heat is generated by oxidation and there arouses quite no problem even if the silicon powder is handled in an industrial quantity of a total surface area (specific surface area×weight) of not less than 1000 m².

Therefore, the silicon powder can be very favorably used as a cathode material for the lithium ion secondary batteries. When practically used being mixed into the graphite, the silicon powder can be added to the graphite in an amount of not less than 10 parts by mass and, specifically, not less than 20 parts by mass per 100 parts by mass of the graphite in order to form a cathode of the lithium ion secondary batteries.

EXAMPLES

The invention will now be described based on the following Experimental Examples.

In the Examples, the particle size (diameter) of the metal particles was calculated according to the following formula presuming that the metal particles were all independent spherical particles.

Diameter $d(m)$ of the metal particles=$6/\rho S$ wherein, S is a BET specific surface area (m²/kg) of the particles, and ρ is a density (kg/m³) of the metal particles.

Further, the apparent oxide layer thickness t (m) was approximately calculated according to the following formula regarding the particles to be spherical.

$$t = \frac{d}{2}\left\{1 - \left(\frac{\rho ox - \rho ox \times Cox}{\rho ox + \rho m \times Cox - \rho ox \times Cox}\right)^{1/3}\right\}$$

wherein, Cox is a weight percentage of the oxide layer and is found from an oxygen concentration measured by the elemental analysis,
d is an apparent average particle diameter (m) and is found from the specific surface area (m²/kg),
ρox is a density (kg/m³) of the oxide layer, and
ρm is a density (kg/m³) of the metal particles.

In the following Examples and Comparative Examples, use was made of a reaction apparatus equipped with a triple tube made of graphite and arranged in concentric. The triple tube was heated by an induced current. The trichlorosilane (TSC) and hydrogen were flown from different nozzles so as to be separately heated, and were mixed together just after they have come out of the triple tube to thereby form the silicon particles. The temperatures of the gases were as shown in Table 1.

Here, a model of the reaction apparatus was prepared. The temperatures of the gases shown in Table 1 were those estimated from the results of analysis of electromagnetic field, analysis of fluids and analysis of heat conduction recommended by the ANSYS relying on the measured results of the graphite temperatures.

Example 1

0.1 Nm³/h of trichlorosilane and 2 Nm³/h of hydrogen were separately heated to prepare fine silicon particles by the SNN method for one hour to thereby obtain about 15 g of a silicon powder. The yield of silicon was about 15%.

Table 1 shows temperatures of the gases as well as a BET specific surface area of the obtained particles, a particle diameter thereof and an apparent oxide layer thickness.

Figure 3:
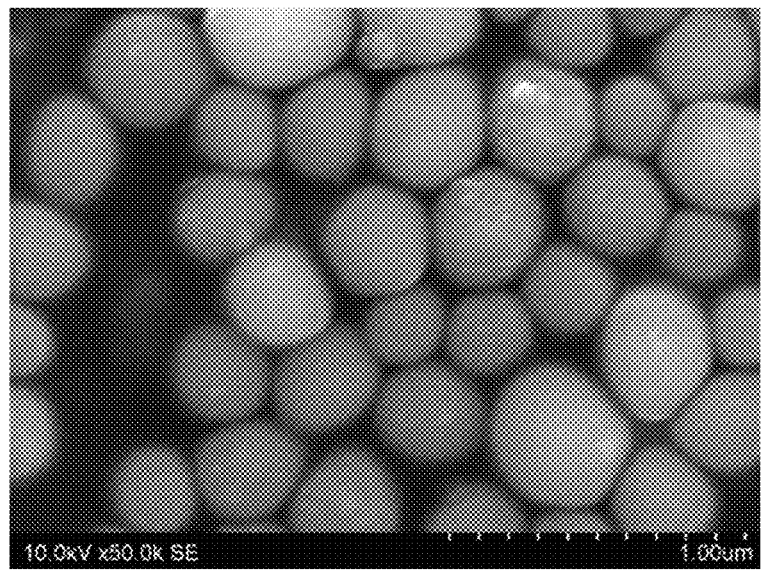
FIG. 3 It is an electron microphotograph of silicon particles obtained in Example 1.

FIG. 3 is an electron microphotograph of the obtained silicon particles. It is learned from FIG. 3 that the silicon particles are monodispersed and have a uniform particle diameter.

Example 2

0.2 Nm³/h of trichlorosilane and 2 Nm³/h of hydrogen were separately heated to prepare fine silicon particles by the SNN method for one hour to thereby obtain about 50 g of a silicon powder. The yield of silicon was about 20%.

Table 1 shows temperatures of the gases as well as a BET specific surface area of the obtained particles, a particle diameter thereof and an apparent oxide layer thickness.

Figure 4:
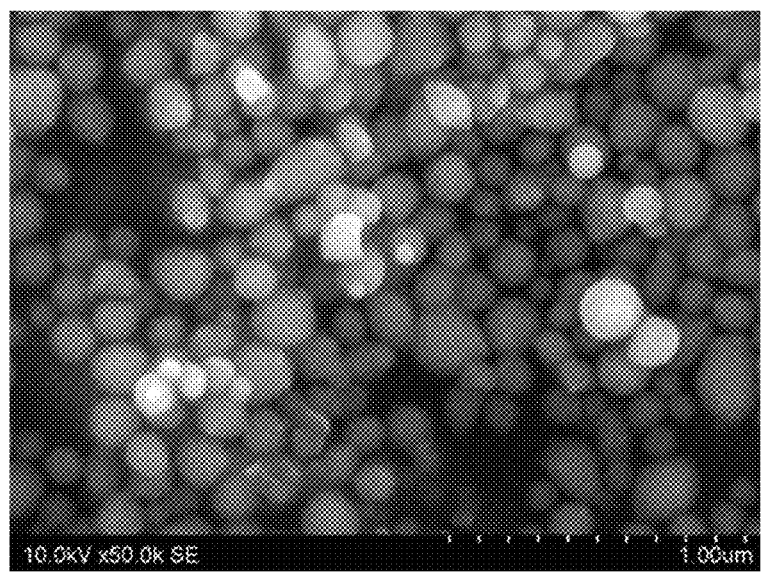
FIG. 4 It is an electron microphotograph of silicon particles obtained in Example 2.

FIG. 4 is an electron microphotograph of the obtained silicon particles. It is learned from FIG. 4 that the silicon particles are monodispersed and have a uniform particle diameter.

Example 3

0.5 Nm³/h of trichlorosilane and 2.5 Nm³/h of hydrogen were separately heated to prepare fine silicon particles by the SNN method for one hour to thereby obtain about 120 g of a silicon powder. The yield of silicon was about 20%.

Figure 5:
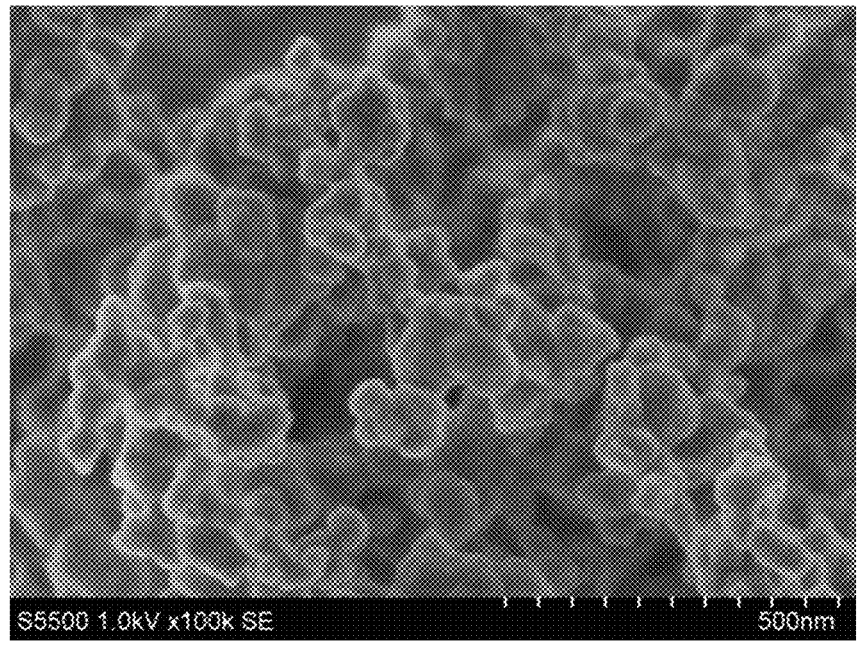
FIG. 5 It is an electron microphotograph of silicon particles obtained in Example 3.

Table 1 shows temperatures of the gases as well as a BET specific surface area of the obtained particles, a particle diameter thereof and an apparent oxide layer thickness. FIG. 5 is an electron microphotograph of the obtained silicon particles.

It is learned that the obtained silicon particles have been agglomerated.

Example 4

1.0 Nm³/h of trichlorosilane and 2.5 Nm³/h of hydrogen were separately heated to prepare fine silicon particles by the SNN method for one hour to thereby obtain about 250 g of a silicon powder. The yield of silicon was about 20%. The obtained particles had been agglomerated.

Table 1 shows temperatures of the gases as well as a BET specific surface area of the obtained particles, a particle diameter thereof and an apparent oxide layer thickness.

Comparative Example 1

0.5 Nm³/h of trichlorosilane and 2.5 Nm³/h of hydrogen were separately heated to prepare fine silicon particles by the SNN method for one hour. However, no fine silicon particle could be collected, and the yield was 0%. Since the gas temperatures were low, the nucleation could not have been executed to a sufficient degree.

Comparative Example 2

Figure 6:
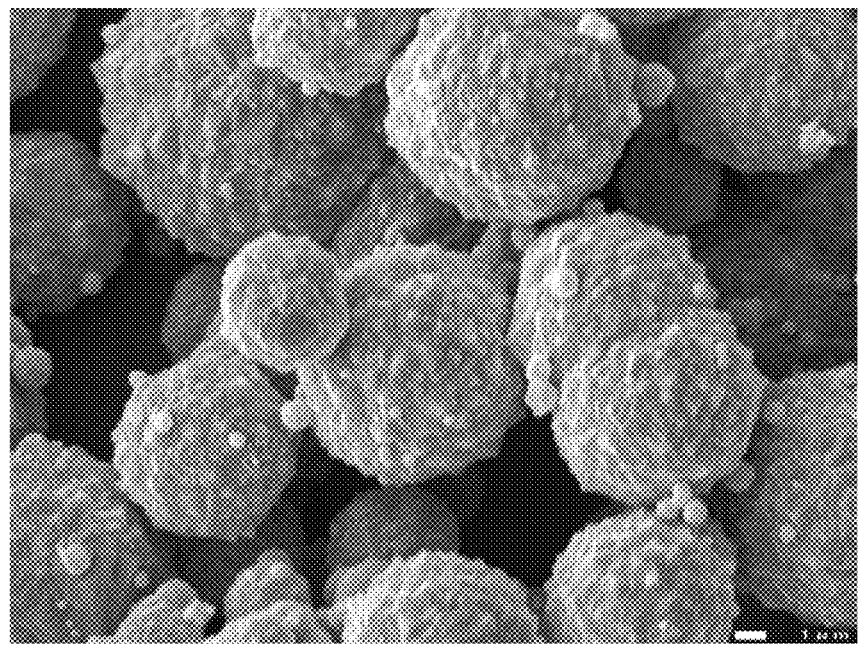
FIG. 6 It is an electron microphotograph of silicon particles obtained in Comparative Example 2.

Immediately after having measured for their flow rates to be 0.5 Nm³/h and 2.5 Nm³/h, the trichlorosilane and hydrogen were mixed together and were fed from the same nozzle. The obtained silicon particles were as shown in FIG. 6 having, however, a specific surface area of as small as 3 m²/g, and had been aggregated.

TABLE 1

| Example | TCS temperature | H$_2$ temperature | Mixed gas ° C. | Specific surface area (m$^2$/g) | Particle diameter (nm) | Apparent oxide film thickness (nm) |
|---|---|---|---|---|---|---|
| Example 1 | 350 | 1450 | 1270 | 9 | 300 | 0.5 |
| Example 2 | 450 | 1450 | 1330 | 17 | 150 | 0.9 |
| Example 3 | 1250 | 1350 | 1330 | 28 | agglomeration of 30 | 1.2 |
| Example 4 | 1100 | 1150 | 1130 | 210 | agglomeration of 10 | 0.8 |
| Comparative Example 1 | 700 | 1100 | 1020 | no sample could be collected | | |
| Comparative Example 2, mixed gas | 1200 | 1200 | 1200 | 0.5 | 5000 | <1.7 |

DESCRIPTION OF REFERENCE NUMERALS

1: reactor
3: multiple tube
7: collector
5: heating apparatus
9: hydrogen circulation line
13: compressor

The invention claimed is:

1. A method of producing a metal powder including:
a preparatory step of providing a metal chloride gas and a reducing gas;
a gas phase reduction step in which said metal chloride gas and said reducing gas are contacted and mixed together so as to undergo a gas phase reduction reaction to form metal particles in a mixed gas stream formed by said metal gas and said reducing gas; and
a collection step of obtaining a metal powder by collecting the metal particles from the gas stream after said gas phase reduction reaction; wherein,
in said preparatory step, said metal chloride gas and said reducing gas are heated separately from each other, said metal chloride gas being maintained at a temperature lower than a thermal decomposition temperature of said metal chloride;
in said preparatory step, a multiple tube is used, the metal chloride gas is fed into at least one tube of said multiple tube, and the reducing gas is fed into at least the other tube of said multiple tube such that said metal chloride gas and said reducing gas are separately heated in said multiple tube;
in said gas phase reduction step, said metal chloride gas and said reducing gas are contacted together so that the temperature of the mixed gas of said metal chloride gas and said reducing gas becomes higher than a temperature at which said gas phase reduction reaction takes place;
the metal powder obtained through said collection step has a BET specific surface area of 5 to 250 m$^2$/g, and
wherein said reducing gas is a hydrogen gas.

2. The production method according to claim 1, wherein in said gas phase reduction step, after said metal chloride gas and said reducing gas are contacted together, the mixed gas stream is cooled within 0.1 seconds.

3. The production method according to claim 1, wherein in said gas phase reduction step, said metal chloride gas and said reducing gas meet together and contact together at the gas outlet port of said multiple tube to undergo the gas phase reduction reaction.

4. The production method according to claim 1, wherein a silicon chloride is used as said metal chloride, and a silicon powder is obtained as said metal powder.

5. The production method according to claim 4, wherein said silicon chloride is a trichlorosilane or a silicon tetrachloride.

6. The production method according to claim 1, wherein after having collected the metal particles contained in the gas stream after said reaction, the hydrogen gas is separated from said gas stream and is fed to said preparatory step.

7. The production method according to claim 1, wherein after having collected the formed metal particles from the gas stream after said reaction, the hydrogen gas and the metal chloride containing the metal particles are separated from said gas stream followed by the recovery of the metal particles contained in the metal chloride that is separated and, thereafter, said metal chloride is fed to said preparatory step.

* * * * *